(12) United States Patent
Tseng et al.

(10) Patent No.: US 7,548,299 B2
(45) Date of Patent: Jun. 16, 2009

(54) FLAT DISPLAY PANEL WITH A SPACER UNIT TO PREVENT DISPLACEMENT BETWEEN UPPER AND LOWER GLASS SUBSTRATES

(75) Inventors: Kuei-Sheng Tseng, Pa (TW); Chung-Jen Cheng Chiang, Hua Lien Hsien (TW); Chu-Yu Liu, Taichung Hsien (TW); Shyh-Feng Chen, Hua Lien Hsien (TW)

(73) Assignee: Au Optronics Corp., Hsinchu (TW)

( * ) Notice: Subject to any disclaimer, the term of this patent is extended or adjusted under 35 U.S.C. 154(b) by 0 days.

(21) Appl. No.: 12/068,058

(22) Filed: Feb. 1, 2008

(65) Prior Publication Data

US 2008/0198317 A1 Aug. 21, 2008

Related U.S. Application Data

(63) Continuation of application No. 10/915,547, filed on Aug. 11, 2004, now Pat. No. 7,352,429.

(30) Foreign Application Priority Data

Jun. 11, 2004 (TW) ................ 93116900 A

(51) Int. Cl.
*G02F 1/1339* (2006.01)
(52) U.S. Cl. .................... 349/155; 349/156
(58) Field of Classification Search ............... 349/155, 349/156, 110, 106, 138, 43
See application file for complete search history.

(56) References Cited

U.S. PATENT DOCUMENTS 5,917,572 A * 6/1999 Kurauchi et al. ............ 349/156

* cited by examiner

*Primary Examiner*—Thoi V Duong
(74) *Attorney, Agent, or Firm*—Thomas, Kayden, Horstemeyer & Risley

(57) ABSTRACT

A display panel includes lower and upper glass substrates. The lower glass substrate includes a pixel array having a plurality of pixel units formed thereon, wherein each pixel unit includes a transparent domain and an opaque domain surrounding the transparent domain, and an upward projection is formed in the opaque domain on the lower glass substrate. The upper glass substrate, mounted on the lower glass substrate, has a spacer formed therebeneath and protruded downwardly therefrom for keeping a cell gap between the upper and lower glass substrates, wherein the spacer is fallen in the opaque domain and has a lateral side in collision with the projection on the lower glass substrate to prevent relative displacement between the lower and upper glass substrates.

14 Claims, 5 Drawing Sheets

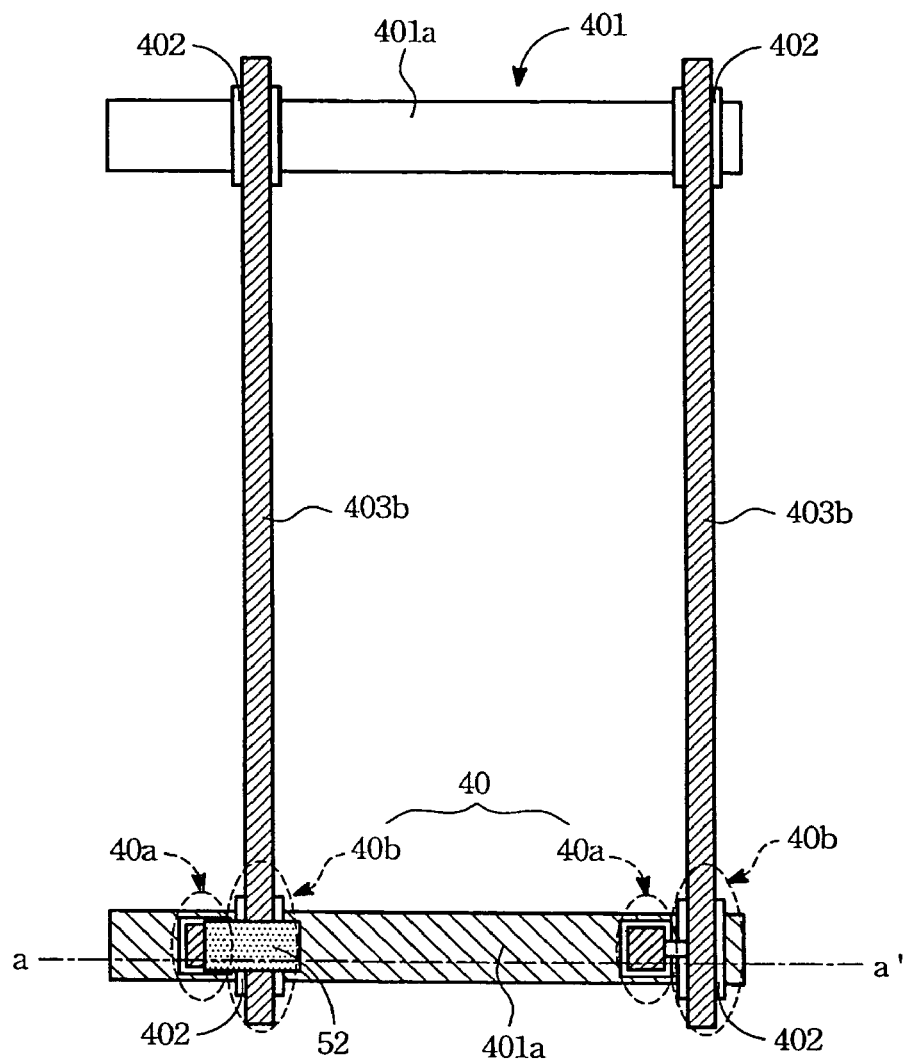
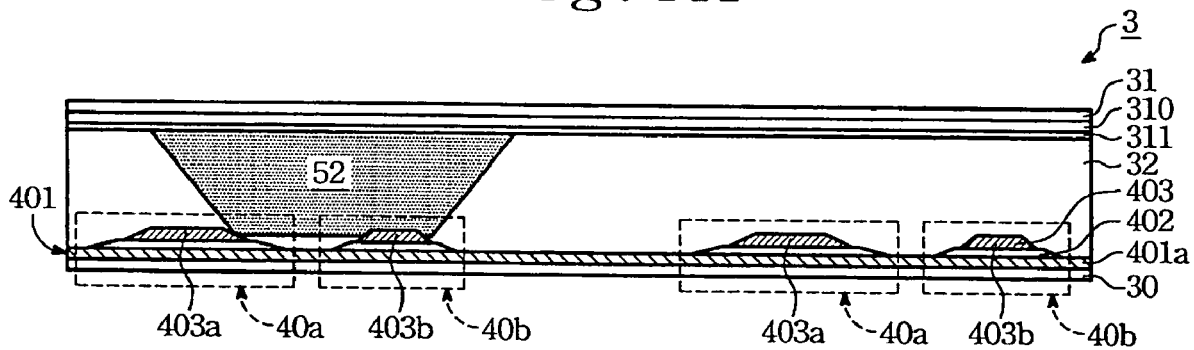
Fig.4A
Fig.4B

FLAT DISPLAY PANEL WITH A SPACER UNIT TO PREVENT DISPLACEMENT BETWEEN UPPER AND LOWER GLASS SUBSTRATES

This application is a Continuation of currently pending application U.S. Ser. No. 10/915,547, entitled "FLAT DISPLAY PANEL WITH A SPACER UNIT TO PREVENT DISPLACEMENT BETWEEN UPPER AND LOWER GLASS" and filed on Aug. 11, 2004 now U.S. Pat. No. 7,352,429.

FIELD OF THE INVENTION

The invention relates to a display panel, more particularly to a flat display panel which includes a spacer unit disposed between upper and lower glass substrates to provide rigidity thereof and to prevent relative movement along lower and upper surfaces of the upper and lower glass substrates.

BACKGROUND OF THE INVENTION

Rapid advance in the manufacture technology of the TFT (thin-film transistor) enhances the function capacity of the flat display panels, such as an LCD (liquid crystal display) panel and organic light emitting diodes. The LCDs are greatly employed in the PDA (personal digital assistant), notebook computers, digital cameras, and video-and-audio recording instruments and mobile phones. The manufacturers worldwide have devoted themselves to further research and thus improve the materials, processes and equipments. The qualities of the LCD are accordingly and largely promoted while the cost goes down day-by-day.

FIGS. 1A and 1B respectively show top planar and sectional views of a pixel unit in the conventional LCD panel, and includes upper and lower glass substrates 2, 1 and a liquid crystal layer sandwiched between the upper and lower glass substrates 2, 1. As shown in FIG. 2A, during the construction, a first conductive layer is fabricated on the lower glass substrate 1 by photolithography to define a pattern which is later etched to form a horizontally extending scan line 11. A dielectric layer 13 and a second conductive layer are successively fabricated on the scan line 11 by deposition. Etching operation is later conducted on the second conductive layer to form a data line 12, a source and a drain in such a manner that the data line 12 transversely crosses the scan line 11. Under this condition, overlapped sections of the data line 12, the dielectric layer 13 and the scan line 11 cooperatively form a projection 15 that protrudes upwardly from the lower glass substrate 1 while overlapped sections of the source, the drain, the dielectric layer 13, and the scan line 11 cooperatively form a TFT adjacent to the projection 15. On the other hand, a color filter, a common electrode layer can be fabricated on the upper glass substrate 2. The upper glass substrate 2 is mounted on the lower glass substrate 1 in such a manner to define an enclosed space therebetween. A liquid crystal solution is injected into the enclosed space so as to form a liquid crystal layer between the upper and lower glass substrates 2, 1.

Note that in the past, prior to injecting the liquid crystal solution and in order to provide rigidity of the conventional LCD panel, a plurality of plastic beads are sprayed onto one of the glass substrates before the other glass substrate is assembled there over. The distribution of the plastic beads within the liquid crystal layer cannot be precisely controlled and is therefore uneven. In addition, the plastic beads are subjected to move within the liquid crystal layer, thereby causing uneven brightness through out the entire length of the display screen.

In FIG. 1B, the spacer unit 21 is usually formed on the upper glass substrate 2 by photolithography in order to overcome the aforesaid uneven distribution and displacement problems, wherein the spacer unit 21 abuts against the lower glass substrate 1. Note that in order not to interfere with the light transmission through the LCD panel, the spacer unit 21 is generally confined within the opaque domain formed on the upper glass substrate 2 in alignment with the scan line 11 and between two adjacent data lines 12 such that the spacer unit 21 will not cover the pixel electrode of the lower glass substrate 1. Since no adhesive is applied between the spacer unit 21 and the lower glass substrate 1, left-and-right sidewise movement between the upper and lower glass substrates 2, 1 is still possible when an external force is applied onto one of the substrates 2, 1. A relatively large displacement between the upper and lower glass substrates 2, 1 may result in exposure of the opaque domain in the upper glass substrate 2, which, in turn, results in light leakage problem and uneven distribution of brightness through out the of the conventional LCD panel.

SUMMARY OF THE INVENTION

The object of the present invention is to provide a flat display panel having a spacer unit disposed between upper and lower glass substrates in such a manner to provide rigidity thereof and to prevent relative movement between the upper and lower glass substrates.

In one aspect of the present invention, a display panel is provided to include: a lower glass substrate including a pixel array having a plurality of pixel units, each of the pixel units including a transparent domain and an opaque domain surrounding the transparent domain, wherein at least two projection units are fabricated on an upper surface of the lower glass substrate within the opaque domain in such a manner that the projection units extend upwardly from the upper surface thereof. A first of the at least two projection units is a thin film transistor, and a second of the at least two projection units is formed by a overlapped section of a scanning line, a dielectric layer, and a data line disposed above the lower glass substrate.

An upper glass substrate disposed on the lower glass substrate, and having a lower surface that faces the upper surface of the lower glass substrate and that is formed with a spacer unit abutting against the upper surface of the lower glass substrate. The spacer unit is disposed within the opaque domain, and has a right and left lateral sides respectively in collision with the first and second projection units to prevent relative movement along the upper and lower surfaces of the lower and upper glass substrates.

In another aspect of the present invention, a display panel is provided to include: a lower glass substrate having an upper surface; a first conductive layer fabricated on the upper surface of the lower substrate to form a horizontally extending scanning line; a second conductive layer having a vertically extending data line, a source and a drain; a dielectric layer sandwiched between the first and second conductive layers to provide insulating effect, each of the first and second conductive layers and the dielectric layer having a section overlapped with one another to form at least two projection units that protrude upwardly from the upper surface of the lower glass substrate, wherein the projection units further includes a first projection unit which is formed by the overlapped sections of the scanning line, the dielectric layer, the source and the drain, and a second projection unit which is formed by the overlapped sections of the scanning line, the dielectric layer, and the data line.

An upper glass substrate disposed on the lower glass substrate, and having a lower surface formed with a spacer unit abutting against the lower glass substrate, wherein the spacer unit is disposed in alignment with the scanning line, and has right and left lateral sides respectively in collision with the first and second projection units to prevent relative movement along the upper and lower surfaces of the lower and upper glass substrates.

In still another aspect of the present invention, a display panel is provided to include: a lower glass substrate formed with a TFT (thin-film transistor); an upper glass substrate formed with a color filter; a liquid crystal layer sandwiched between the lower and upper glass substrates; a common electrode fabricated on a lower surface of the color filter; a first conductive layer fabricated on an upper surface of the lower glass substrate, and having a plurality of horizontally extending scanning lines; a second conductive layer having a plurality of data lines, a plurality of sources and a plurality of drains; a dielectric layer sandwich between the first and second conductive layers to provide an insulating effect, each of the first and second conductive layers and the dielectric layer having a section overlapped with one another to form a projection unit that protrudes upwardly from the lower glass substrate and that defines the TFT; and a plurality of spacers disposed between the lower and upper glass substrates, each of the spacers having an upper end connected to the common electrode and a lower end that abuts against the lower glass substrate and that is disposed in alignment with a respective one of the scanning lines, one of the spacers further having a lateral side in collision with the projection unit to prevent relative movement along the upper and lower surfaces of the lower and upper glass substrates.

BRIEF DESCRIPTION OF THE DRAWING

Other features and advantages of this invention will become more apparent in the following detailed description of the preferred embodiments of this invention, with reference to the accompanying drawings, in which:

FIGS. 4A and 4B respectively show top and cross-sectional views of the third preferred embodiment of the pixel unit in the display panel according to the present invention.

DETAILED DESCRIPTIONS OF THE PREFERRED EMBODIMENTS

Figure 1A:
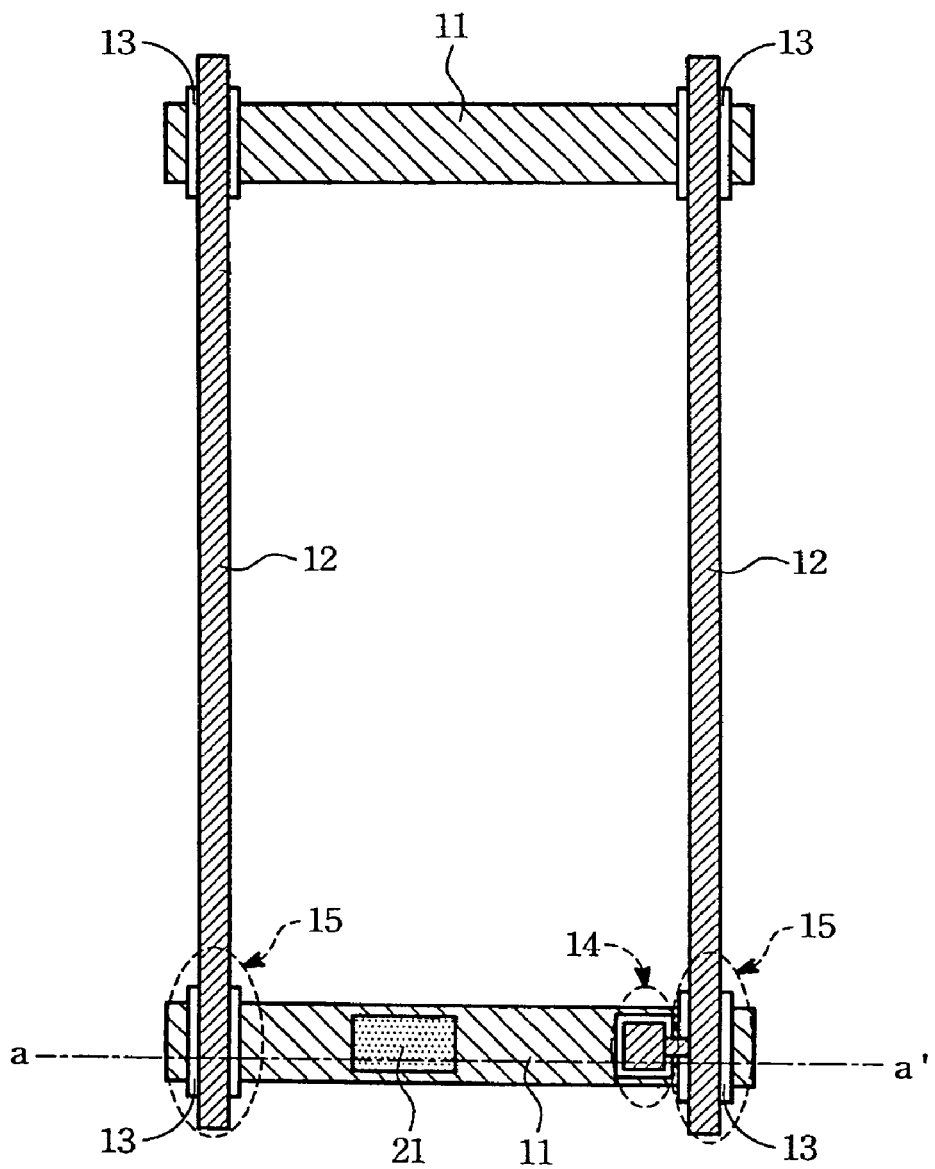
FIGS. 1A and 1B respectively show top and cross-sectional views of a pixel unit in a prior art display panel.
Figure 1B:
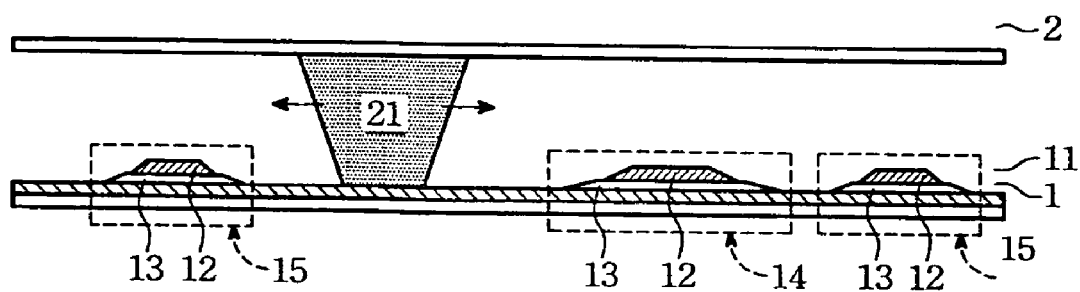

Before the present invention is described in greater detail with reference to the following preferred embodiments, it should be noted that same reference numerals have been used to denote similar elements throughout the specification.

In order to prevent relative displacement between the upper and lower glass substrates, a spacer unit is fabricated on the upper glass substrate according to the present invention in such a manner that after assembly thereof the spacer unit has a lateral side in collision with a projection unit formed on the lower glass substrate so as to prevent relative movement along upper and lower surfaces of the lower and upper glass substrates, thereby preventing aforesaid light leakage problem encountered in the prior art.

Figure 2A:
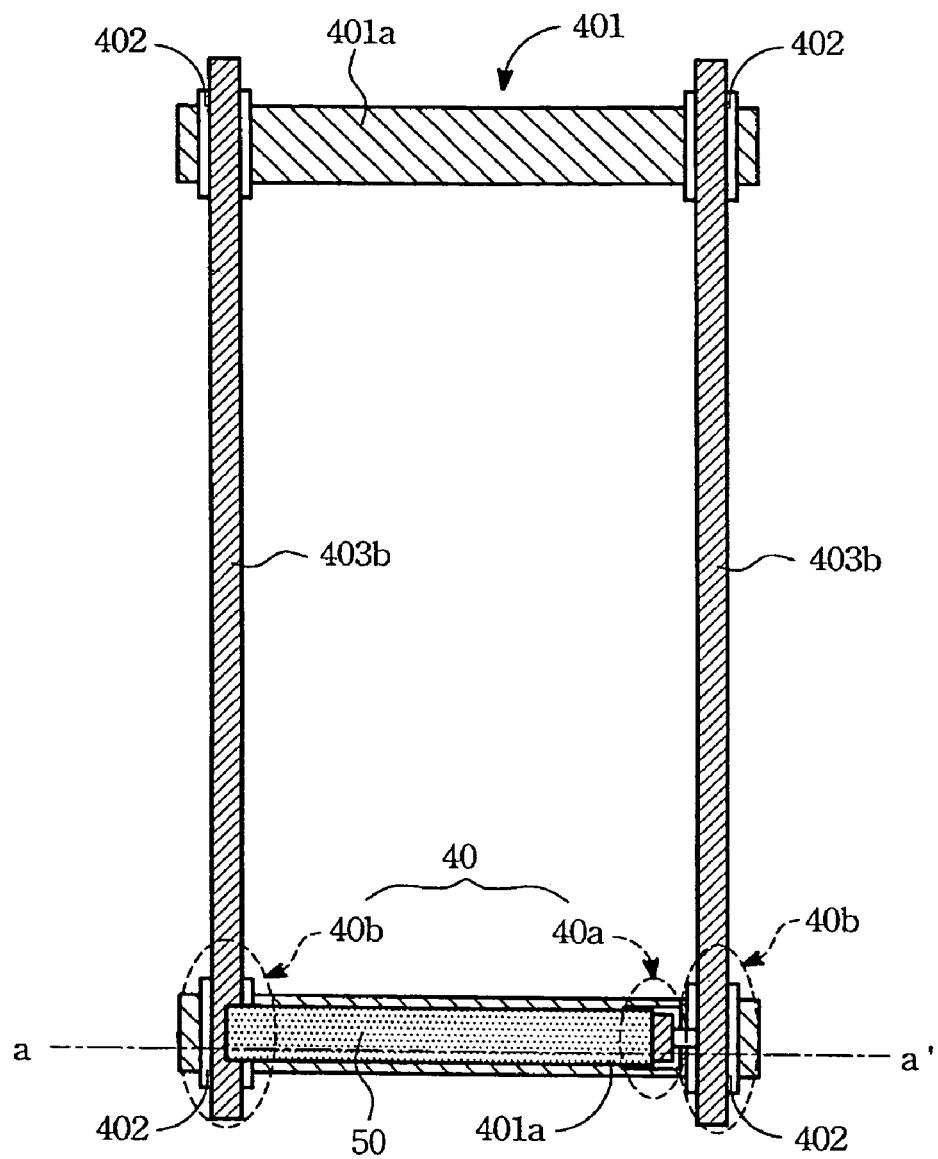
FIGS. 2A and 2B respectively show top and cross-sectional views of the first preferred embodiment of a pixel unit in a display panel according to the present invention.
Figure 2B:
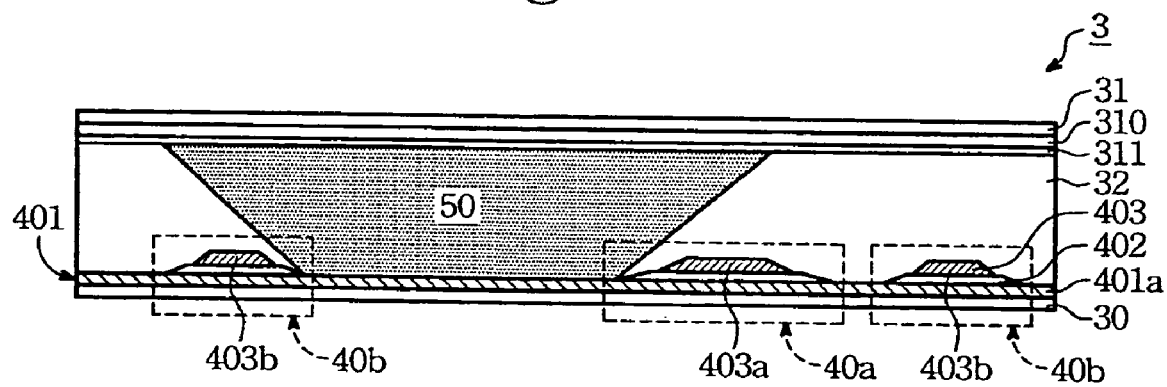

Referring to FIGS. 2A and 2B, top planar and cross-sectional views of the first preferred embodiment of a pixel unit in a flat display panel of the present invention is shown to include a lower glass substrate 30 for fabricating a TFT, an upper glass substrate 31 for fabricating a color filter 310, and a liquid crystal layer 32 sandwiched between the lower and upper glass substrates 30, 31. The pixel unit defines a transparent domain to permit transmission of light therethrough and an opaque domain surrounding the transparent domain. The color filter 310 is fabricated on the lower surface of the upper glass substrate 31 so as to generate blue, red and green colors when light is passed therethrough. A common electrode 311 is fabricated on the color filter 310 in alignment with the pixel electrode on the lower glass substrate 30 to induce an electric field therebetween upon application an operating voltage onto the liquid crystal layer 32 so as to change the orientation of the liquid crystal molecules in the liquid crystal layer 32.

A first conductive layer 401, a dielectric layer 402, and a second conductive layer 403 are successively fabricated on the upper surface of the lower grass substrate 30 in such a manner that the dielectric layer 402 is sandwiched between the first and second conductive layers 401, 403 to provide insulating effect. In general, the first conductive layer 401 is deposited on the lower glass substrate 30. Afterward, photolithography and etching operations are conducted on the first conductive layer 401 to form a plurality of scanning lines 401a, which extend horizontally on the lower glass substrate 30a. The same operations are conducted on the second conductive layer 403 to form a plurality of sources/drains 403a and a plurality of data lines 403b that extend vertically on the lower glass substrate 30 transverse to the scanning lines 401a, respectively.

Note that, each of the first conductive layer 401, the dielectric layer 402 and the second conductive layer 403 has a section overlapped with one another to form at least two projection units 40 that protrude upwardly from the lower glass substrate 30. As shown in FIG. 2B, the projection units 40 include a first projection unit 40a which is formed by combing the overlapped sections of the source/drain 403a, the dielectric layer 402 and a respective scanning line 401a, and a second projection unit 40b which is formed by combining the overlapped section of a respective data line 403b, the dielectric layer 402, and the respective scanning line 401a. In the first preferred embodiment, since the drain 403a of the first projection unit 40a is connected to the respective data line 403b to permit transfer of information therethrough, the first projection unit 40a subsequently servers as a TFT and is disposed between adjacent two of the second projections unit 40b at non-equivalent distances.

In order to preserve a gap between the lower and upper glass substrates 30, 31, the spacer unit 50 is fabricated on the upper glass substrate 31 by photolithography technique prior to injecting the liquid crystal solution between the lower and upper glass substrates 30, 31 such that after assembly the spacer unit 50 is disposed in alignment with and abuts against the respective scanning line 401a on the lower glass substrate 30 while its right and left lateral sides thereof are disposed within and collide respectively with adjacent pair of the first and second projection units 40a,40b, thereby preventing relative displacement along left-and-right side direction even when an external force is applied onto the glass substrates 30, 31.

Figure 3A:
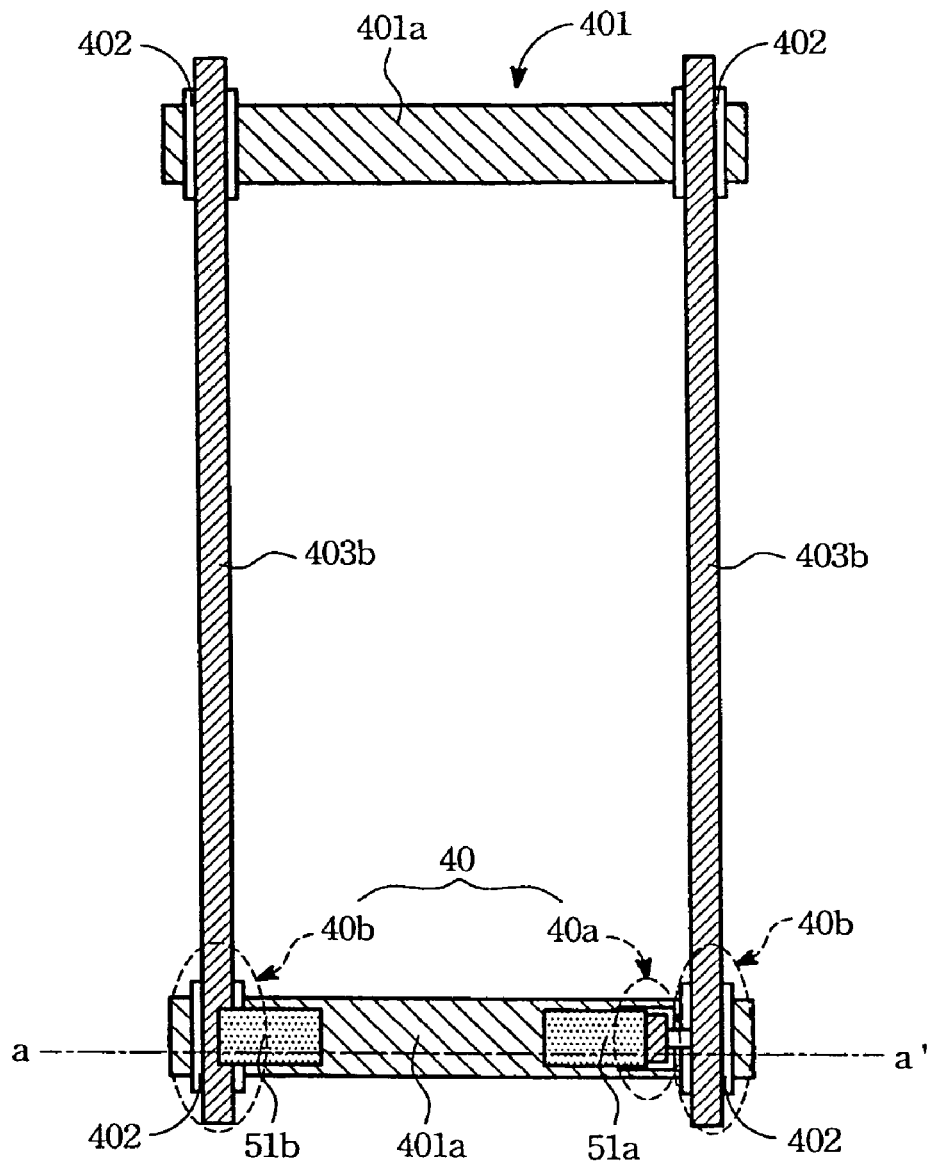
FIGS. 3A and 3B respectively show top and cross-sectional views of the second preferred embodiment of the pixel unit in the display panel according to the present invention.
Figure 3B:
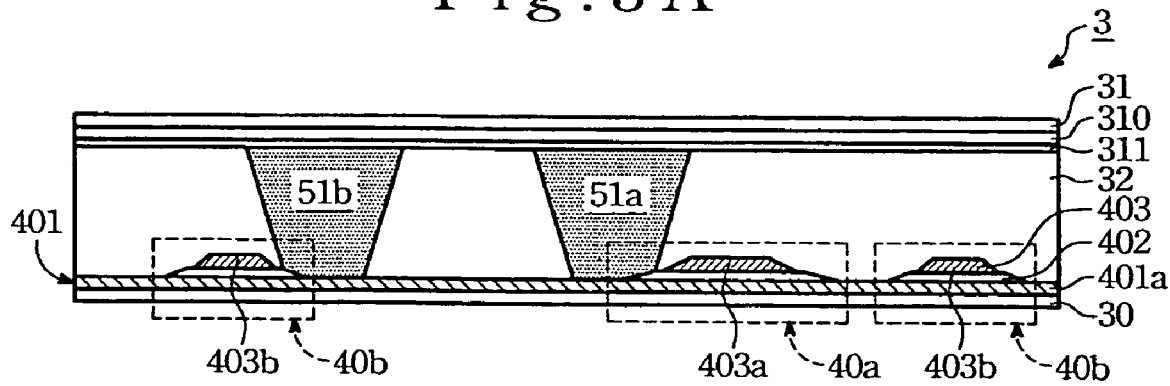

Referring to FIGS. 3A and 3B, the second preferred embodiment of the pixel unit in the flat display panel of the present invention is shown to have a construction similar to the first preferred embodiment. The only difference resides in that two minor spacer units 51a, 51b are fabricated on the upper glass substrate 31 instead of the spacer unit in such a manner that after assembly the spacer units 51a, 51b simultaneously abut against the lower glass substrates 30 while the right lateral side of the first spacer unit 51a and the left lateral side of the second spacer unit 51b are respectively in collision with the first projection unit 40a and the second projection unit 40b.

Referring to FIGS. 4A and 4B, the third preferred embodiment of the pixel unit in the flat display panel of the present invention is shown to have a construction similar to the first preferred embodiment. The only difference resides in that the spacer unit 52 is fabricated on the upper glass substrate 31 in such a manner that after assembly the spacer unit 52 abut against the top portions of adjacent two of the first and second projections 40a, 40b, thereby providing a relatively large friction between the spacer unit 52 and the first and second projections 40a, 40b to prevent relative displacement between the lower and upper glass substrates 30, 31.

Figure 5A:
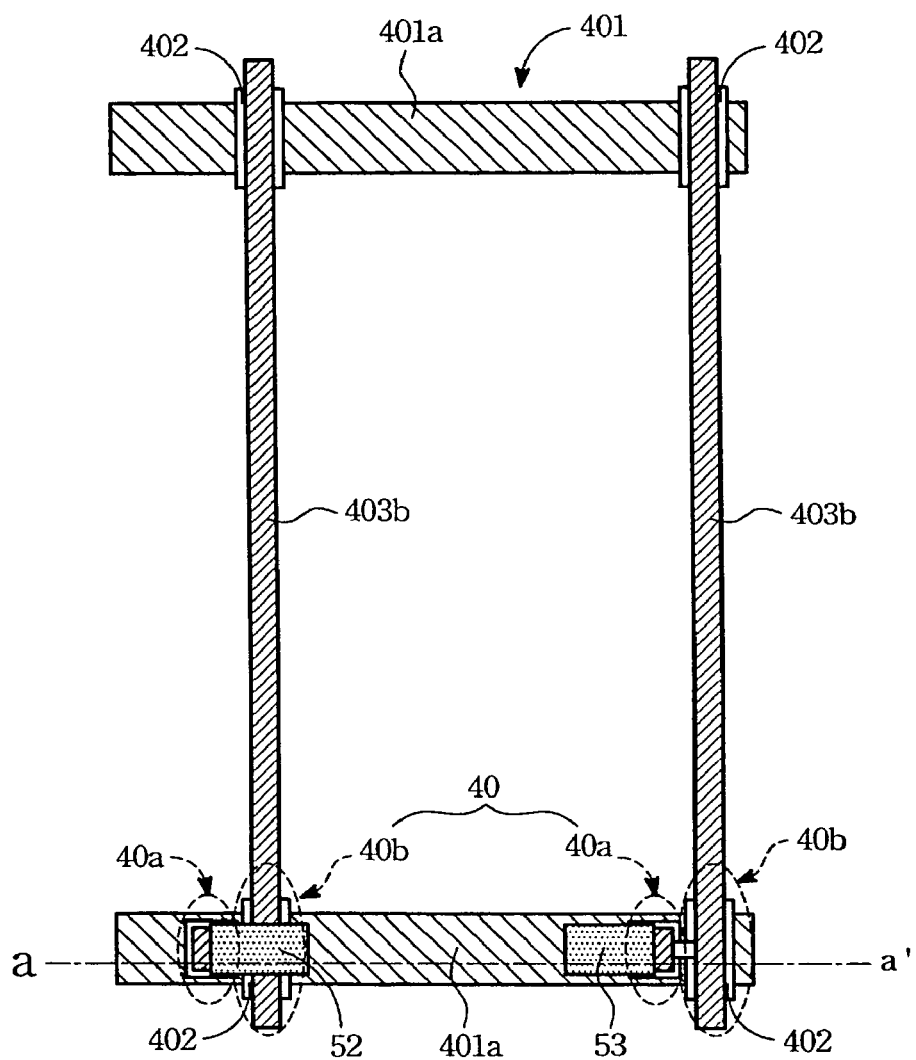
FIGS. 5A and 5B respectively show top and cross-sectional views of the fourth preferred embodiment of the pixel unit in the display panel according to the present invention.
Figure 5B:
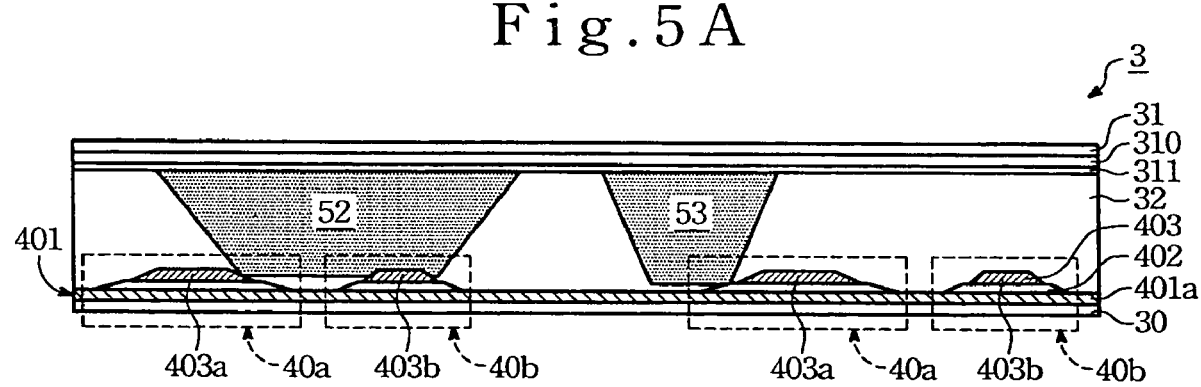

Referring to FIGS. 5A and 5B, the fourth preferred embodiment of the pixel unit in the flat display panel of the present invention is shown to have a construction similar to the third preferred embodiment. The only difference resides in that an auxiliary spacer 53 is fabricated on the upper glass substrate 31 adjacent to the spacer unit 52 in such a manner that after assembly the spacer unit 52 abut against the top portions of adjacent two of the first and second projections 40a, 40b while the auxiliary spacer 53 has a lateral side colliding against the other one of the first projections 40a next to the second projection 40b, thereby providing a considerably large friction to prevent relative displacement between the lower and upper glass substrates 30, 31.

In the above preferred embodiments, the spacer unit in the pixel unit should be arranged so as to locate within the opaque domain of the pixel unit so as not to occur the light leakage as happened in the pixel unit of the prior art display panel due to displacement between the lower and upper glass substrates.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A display panel comprising:
a lower glass substrate including a pixel array having a plurality of pixel units, each of said pixel units including a transparent domain and an opaque domain surrounding said transparent domain, at least two projection units are disposed on an upper surface of said lower glass substrate within said opaque domain in such a manner that said projection units extend upwardly from said upper surface thereof, wherein a first of said at least two projection units is a thin film transistor, and a second of said at least two projection units is formed by a overlapped section of a scanning line, a dielectric layer, and a data line disposed above said lower glass substrate; and
an upper glass substrate disposed on said lower glass substrate, and having a lower surface that faces said upper surface of said lower glass substrate and that is formed with a spacer unit abutting against said upper surface of said lower glass substrate, said spacer unit being disposed within said opaque domain and having right and left lateral sides respectively in collision with said first and said second projection units.

2. The display panel according to claim 1, further comprising a color filter disposed between said upper glass substrate and said spacer unit.

3. The display panel according to claim 1, further comprising a liquid crystal layer sandwiched between said lower and upper glass substrates.

4. A display panel comprising:
a lower glass substrate including a pixel array having a plurality of pixel units, each of said pixel units including a transparent domain and an opaque domain surrounding said transparent domain, at least two projection units are disposed on an upper surface of said lower glass substrate within said opaque domain in such a manner that said projection units extend upwardly from said upper surface thereof, wherein a first of said at least two projection units is a thin film transistor, and a second of said at least two projection units is formed by a overlapped section of a scanning line, a dielectric layer, and a data line disposed above said lower glass substrate; and
an upper glass substrate disposed on said lower glass substrate, and having a lower surface that faces said upper surface of said lower glass substrate and that is formed with at least two spacer units abutting against said upper surface of said lower glass substrate, said spacer units being disposed within said opaque domain, the right lateral side of a first of said at least two spacer units and the left lateral side of a second of said at least two spacer units are respectively in collision with said first projection unit and said second projection unit.

5. The display panel according to claim 4, further comprising a color filter disposed between said upper glass substrate and said spacer units.

6. The display panel according to claim 4, further comprising a liquid crystal layer sandwiched between said lower and upper glass substrates.

7. A display panel comprising:
a lower glass substrate having an upper surface;
a first conductive layer fabricated on said upper surface of said lower substrate to form a horizontally extending scanning line;
a second conductive layer having a vertically extending data line, a source and a drain;
a dielectric layer sandwiched between said first and second conductive layers to provide insulating effect, each of said first and second conductive layers and said dielectric layer having a section overlapped with one another to form at least two projection units that protrude upwardly from said upper surface of said lower glass substrate, wherein said projection units further includes a first projection unit which is formed by said overlapped sections of said scanning line, said dielectric layer, said source and said drain, and a second projection unit which is formed by said overlapped sections of said scanning line, said dielectric layer, and said data line; and
an upper glass substrate disposed on said lower glass substrate, and having a lower surface formed with a spacer unit abutting against said lower glass substrate, wherein said spacer unit is disposed in alignment with said scanning line, and has right and left lateral sides respectively colliding with said first and said second projection units.

8. The display panel according to claim 7, further comprising a color filter fabricated on said lower surface of said upper glass substrate in such a manner so as to be sandwiched by said upper glass substrate and said spacer unit.

9. The display panel according to claim 8, further comprising a common electrode fabricated on a lower surface of said color filter in such a manner so as to be sandwiched by said color filter and said spacer unit.

10. The display panel according to claim 7, further comprising a liquid crystal layer sandwiched between said lower and upper glass substrates.

11. A display panel comprising:

a lower glass substrate having an upper surface;

a first conductive layer fabricated on said upper surface of said lower substrate to form a horizontally extending scanning line;

a second conductive layer having a vertically extending data line, a source and a drain;

a dielectric layer sandwiched between said first and second conductive layers to provide insulating effect, each of said first and second conductive layers and said dielectric layer having a section overlapped with one another to form at least two projection units that protrude upwardly from said upper surface of said lower glass substrate, wherein said projection units further includes a first projection unit which is formed by said overlapped sections of said scanning line, said dielectric layer, said source and said drain, and a second projection unit which is formed by said overlapped sections of said scanning line, said dielectric layer, and said data line; and an upper glass substrate disposed on said lower glass substrate, and having a lower surface formed with at least two spacer units abutting against said lower glass substrate, wherein said spacer units are disposed in alignment with said scanning line, and the right lateral side of a first of said at least two spacer units and the left lateral side of a second of said at least two spacer units are respectively in collision with said first projection unit and said second projection unit.

12. The display panel according to claim 11, further comprising a color filter fabricated on said lower surface of said upper glass substrate in such a manner so as to be sandwiched by said upper glass substrate and said spacer units.

13. The display panel according to claim 12, further comprising a common electrode fabricated on a lower surface of said color filter in such a manner so as to be sandwiched by said color filter and said spacer unit.

14. The display panel according to claim 11, further comprising a liquid crystal layer sandwiched between said lower and upper glass substrates.

\* \* \* \* \*